March 16, 1926.　　　　　　　　　　　　　　　1,577,071
L. A. OSGOOD ET AL
SCALE
Filed August 1, 1923　　　2 Sheets-Sheet 1

INVENTOR
Louis A. Osgood and
Elmer E. Wolf
BY
Duell, Warfield & Duell
ATTORNEY

March 16, 1926.
L. A. OSGOOD ET AL
SCALE
Filed August 1, 1923
1,577,071
2 Sheets-Sheet 2
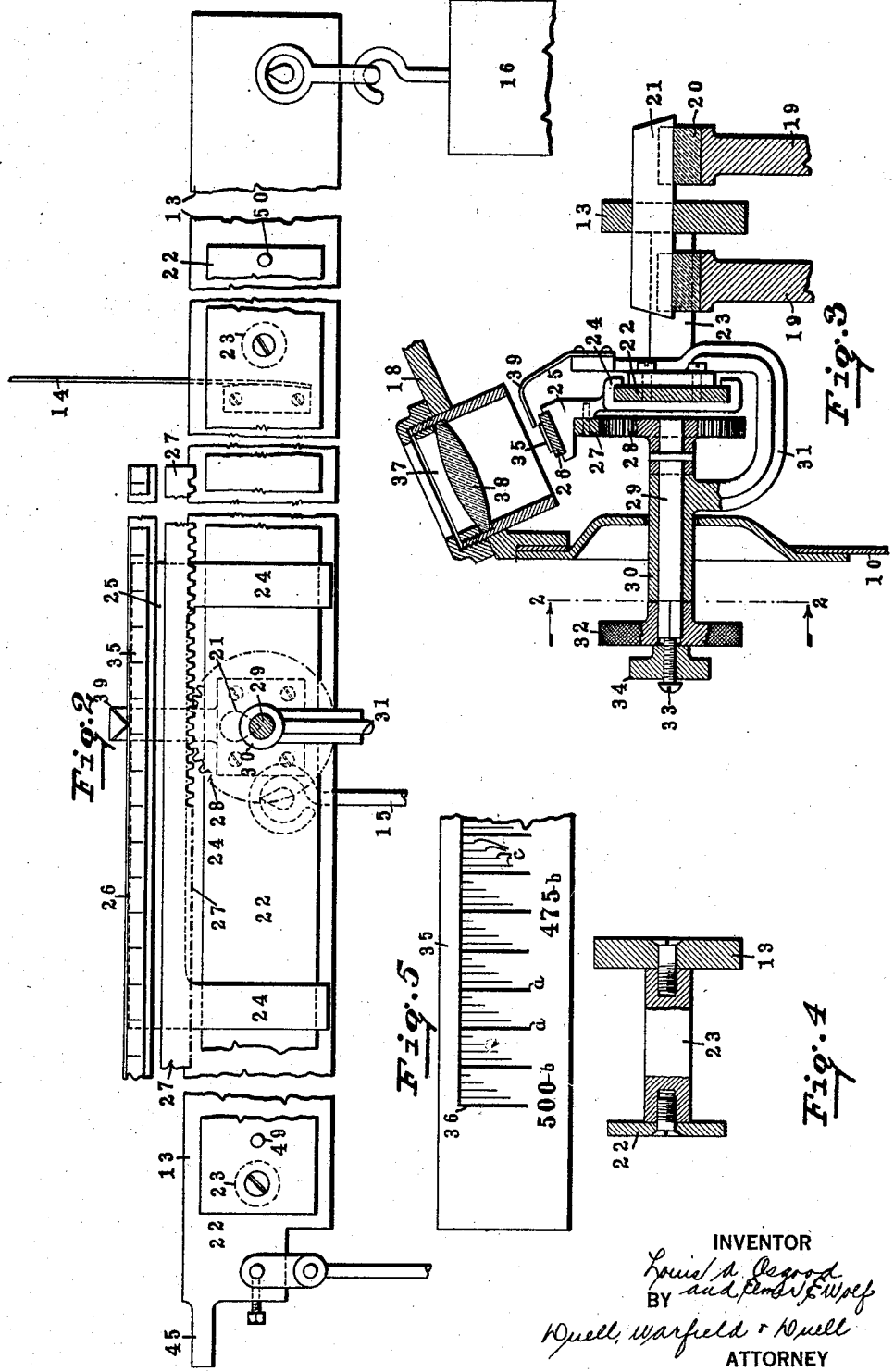
INVENTOR
ATTORNEY Patented Mar. 16, 1926.

1,577,071

UNITED STATES PATENT OFFICE.

LOUIS A. OSGOOD, OF ST. JOHNSBURY, VERMONT, AND ELMER E. WOLF, OF SPRINGFIELD, OHIO, ASSIGNORS TO E. AND T. FAIRBANKS AND COMPANY, OF ST. JOHNSBURY, VERMONT, A CORPORATION OF VERMONT.

SCALE.

Application filed August 1, 1923. Serial No. 654,986.

*To all whom it may concern:*

Be it known that we, LOUIS A. OSGOOD and ELMER E. WOLF, citizens of the United States, residing at St. Johnsbury and Springfield, respectively, in the counties of Caledonia and Clark, respectively, and States of Vermont and Ohio, respectively, have invented certain new and useful Improvements in Scales, of which the following is a full, clear, and exact description, such as will enable others skilled in the art to which it appertains to make and use the same.

This invention relates to a scale and aims to provide certain improvements in connection with a mechanism of this type, these improvements being primarily dedicated to the provision of a counterpoise, which is particularly intended for use as a part of a tare system, although the invention is not necessarily restricted to this use.

It is an object of the present invention to provide a device which, viewed in its broadest aspects, is an improved counterpoise, this device embracing a mechanism of extremely simple construction which is disposed in association with the mechanism of a scale in such a manner that the normal operation of the latter is in no wise interfered with.

It is a further object of the invention, to provide a device of the character stated, with which there will be associated a registering mechanism whereby the relation of the device to the scale mechanism may be determined, said device having a materially greater capacity than articles of this nature as heretofore proposed.

It is a still further object of the invention to incorporate in the device a means whereby the registering medium may be read far more readily than has heretofore been possible, this reading being effected in such a manner that a minimum of time will be lost in determining the relative positions of the parts, aside from the fact that in using the mechanism an operator employs what might be termed a neutral point of sight which permits of a direct reading of the indicia.

Another object of the present invention is that of furnishing a counterpoise particularly intended for use in connection with a tare system, and in which the setting of the parts may be determined by a direct reading of the mechanism, so that play between the various units of the device does not have to be taken into consideration in the result arrived at by this reading.

Still another object of this invention is that of furnishing a scale incorporating a mechanism consistent with the accomplishment of the objects already reviewed, and which will also preferably embrace a dial of any desirable type, an operator being enabled to determine the readings of both the mechanism and dial without it being necessary for him to change his position, in order to accomplish this result.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which:

Fig. 2 is an enlarged front elevation of parts of certain of the mechanism embraced in the present scale, this view being taken along the lines 2—2 and in the direction of the arrows indicated in Fig. 3.

Fig. 3 is a transverse sectional view of the mechanism as shown in Fig. 2.

Fig. 4 is a sectional view illustrating the construction employed to connect the counterpoise with the main beam.

Fig. 5 is an enlarged fragmentary view of the index which may be associated with the face plate of the scale.

Figure 1:
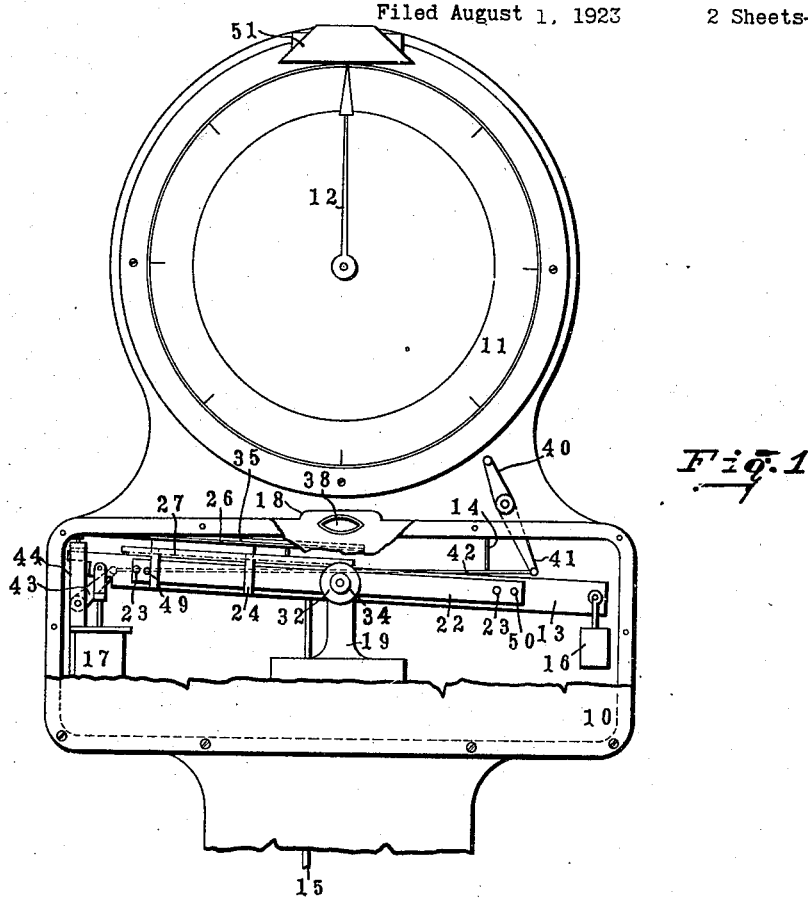
Fig. 1 is a fragmentary front elevation of a scale embodying the construction of the present invention and showing certain of the exterior portions of the same broken away to disclose the underlying structure.
Figure 7:
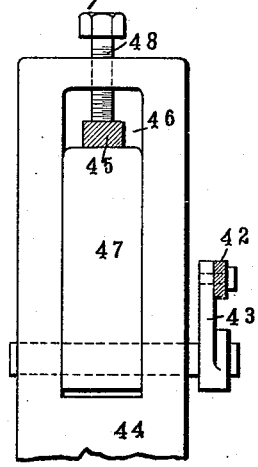
Fig. 7 is a sectional side view taken along the lines 7—7 and in the direction of the arrows indicated in Fig. 6.

Referring particularly to Fig. 1, it will be seen that a scale has been illustrated the body of which is closed by means of a housing 10. The scale may include a registering mechanism embracing a dial 11 of any desirable type, with which a pointer 12 cooperates, it being understood that the latter is connected with the main beam 13 of the scale by any suitable means such as a tape 14, the main beam being in turn connected to a weight receiving member (not shown) by a rod 15. It will also be noted that a balance weight 16 may be connected with one end of the main beam 13, while a dashpot 17 may be associated with the opposite end thereof, it being understood that all of the mechanism aforementioned, serves to insure a proper response of the pointer 12 when a load has been deposited upon the platform or other weight-receiving device of the scale, this response being, of course, subject to the proper counterbalancing of the load.

Referring now to Fig. 3, as well as Fig. 1, it will be noted that in the present embodiment of the invention, the housing 10 is formed with an offset portion 18 adjacent the lower edge of that portion of the housing which incloses the dial, and the housing at this point is provided with an opening through which an operator may view the interior of the scale without it being necessary for him to change the position which he assumes during the reading of the dial. Within the scale housing and adjacent this opening, a beam support 19 is positioned, and this support carries suitable bearing portions 20 upon which the pivot member 21 of the main beam 13 rests, and thus it is obvious, upon a weight being removed from or deposited upon the weight receiving portion incorporated in the scale, that the beam 13 will be rocked by means of the rod 15, and this rocking movement will be transmitted by the tape 14 to the registering mechanism.

In the present instance it will be seen that the counterpoise provides a tare device and that the actual load supported upon the weight receiving member of the scale, is counteracted by a weight or other suitable medium. It is to be understood, however, as will readily be apparent, that the device which will be hereinafter described, and which in the present embodiment forms the tare member, might readily be employed for the purpose of weighing the load.

In this exemplification of the invention the poise embraces a counterweight in the nature of a poise beam including a tare beam 22, which is rigidly attached to the main beam and in advance thereof by means of studs 23 extending between the two. Movably supported upon the tare beam 22 by means of brackets 24 is a slide 25, which carries an angularly disposed face plate 26 arranged to move in line with the opening of the offset portion 18 of the housing.

With a view of positively moving the slide 25 longitudinally of the tare beam, it will be noted that the former preferably carries a bar 27 having its lower edge serrated and engaged by a pinion 28 mounted upon a shaft 29. This shaft is supported by the scale mechanism in that, a portion of the same is enclosed by a sleeve 30, to which one end of a bracket 31 is attached, the opposite end of this bracket being secured to the beam 22, the parts being so disposed that the axis of the shaft 29 is in alignment with the fulcrum edge of the scale pivot 21 as has clearly been illustrated in Fig. 3. The sleeve 30 extends through an opening in the housing 10 and the shaft 29 projects beyond the sleeve and has a knurled nut 32 attached to its body so that by rotating the nut, the pinion 28 will turn to reciprocate the slide 25 along the beam 22. In this connection it is to be understood that the movement of the poise beam rearward of its most retracted position is prevented incident to the fact that an obstruction such as a pin 49 is associated with one end of the tare beam 22, and in this position the adjacent bracket 24 contacts with this pin. Also, a movement beyond a predetermined point in an opposite direction is prevented by means of an obstruction such as a similar pin, which engages the second bracket when the poise is projected to this position.

Now with a view of furnishing a mechanism preventing an accidental disturbance of the poise beam, a locking device may be utilized, in that the nut 32 may be capable of a limited longitudinal movement along the end of the shaft 29 which is squared at this point. A screw threaded pin 33 is attached to the end of the shaft and forms a part of the locking device and mounts a lock nut 34. Thus, although as aforestated, the shaft 29 may readily be turned by the knurled nut 32, it will be obvious that the latter may be tightened to bear against the end of the sleeve 30, by simply turning the lock nut 34 so that all of the parts are fixed with respect to each other, and no accidental movement of the poise beam may occur.

In order that the poise beam may have a great capacity and cover a great range of weight variations, an index strip 35 is affixed to the face plate 26, and as will be apparent in Fig. 5, this strip has upon its upper surface a minutely subdivided scale 36. Due to the limited space available, the graduations are such as to be hardly capable of being read with any degree of accuracy by the naked eye, and thus it is preferred that the opening in the offset portion 18 of the housing carry a mounting 37 which supports a lense 38, which may be spherical, for a purpose hereinafter brought out, and which will enlarge the scale 36 to such an extent as to render the same readily capable of being read. In order to facilitate this reading, a pointer 39 may be supported by the bracket 31, this pointer being in registry with the graduations of the index, and in order to further remove the possibility of error occurring, it is to be noted that it is preferred, as has been shown in Fig. 5, that every main graduation (a) of the index, be indicated by a relatively heavy line, and for example, adjacent every fifth of these main graduations an indicating mark or numeral (b) may be provided. Between each of the main graduations there are arranged a series of sub-graduations (c) and each of the sub-graduations of any series is of increasingly greater length. Thus an operator at a glance, will be able to ascertain the exact setting of the parts in that the pointer 39 will register with that graduation which indicates this setting and the value of the graduation in question may be immediately determined due to the dissimilarity of adjacent graduations and the increasingly greater length of the same which serves to facilitate this result being achieved. In this connection it is to be noted that no inaccuracy can occur due to play which may come into existence between the parts or due to other causes, in that incident to the axial alignment of the shaft 29 with the bearing edge of the beam pivot 21, it is apparent that these parts will always be in properly correlated position. Also, for the reason that the pointer 39 is carried by the bracket 31, it will not be necessary to take into consideration any inclination of the beam 13 due to the fact that the counterpoise is locked relative to this beam. Also, it is obvious, that while the play between the rack and pinion might be taken up by any suitable adjustment, this play will not result in a faulty reading by virtue of the fact that the scale 36 is carried by the poise, and furthermore for the reason that if the lense 38 is of the spherical type, the line of vision therethrough will be concentrated upon that graduation which underlies the pointer and is in exact registry therewith. In other words, the reading will be direct and a neutral point of sight will be provided.

With a view of providing means serving to lock the beam 13 against movement so that the load supporting means of the scale may be correspondingly held against movement, or the tare system may be accurately set, it will be noted that an operating member in the nature of a crank 40, extends beyond and is movably mounted upon the housing 10 by means of a shaft extending through the same and a lever 41 is attached to the inner end of the shaft and is connected by means of a link 42 with a bell crank 43 which is carried by a suitable support 44. The end of the beam 13 may be reduced as at 45 and extends into an opening 46 within which the second arm 47 of the bell crank 43 is movably disposed, and a set screw 48 also extends into the opening 46 and is mounted so that its inner end extends into a plane occupied by the end of the main beam 13 when the latter is swung to its uppermost position.

Figure 6:
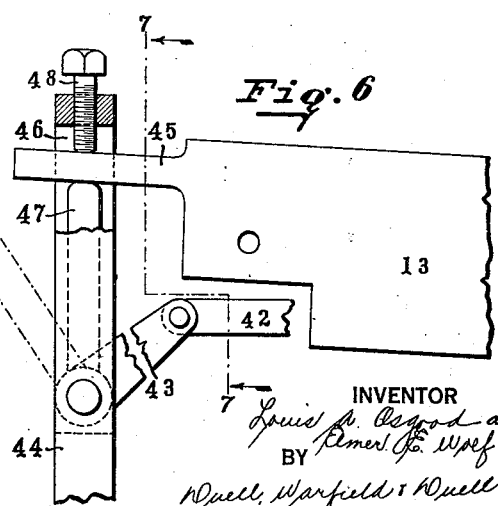
Fig. 6 is an enlarged fragmentary, partly sectional, front view of a detail of the scale mechanism as shown in Fig. 1.

Thus, it is apparent that when the operating member 40 is swung, the link 42 will be correspondingly moved to rock the bell crank 43, and assuming that the latter is in the position indicated in dotted lines in Fig. 6, it will be apparent that the arm 47 of the same will be swung until it engages the under side of the reduced portion 45 of the beam 13 and presses against the under surface of the same to cause the upper face of this part to bear against the inner end of the set screw 48, as in full lines, it being noted that when the parts are in this position, they will be locked.

The poise beam constituting the tare system is normally in the position indicated in Fig. 1, i. e., virtually the entire body of the same is disposed wholly to one side of the pivot member 21 of the main beam. If it is desired to individually weigh the contents of a number of receptacles, and the weight of the latter is not known, it will be understood that this weight may be ascertained by placing an empty receptacle of a similar type on the platform and turning the knurled knob or nut 32 until the poise beam acts as a counterpoise and counterbalances the receptacle, at which point the poise beam is locked by means of the nut 34. The weight of the receptacle, may also be ascertained by means of the other weighing mechanism incorporated in the scale and after this weight has been determined, the beam 13 may be locked against movement by means of the operating member 40, lever 41, etc., and the tare member may be set to provide a counterpoise of a value corresponding to the weight of the receptacle subsequent to which the poise beam involving this tare system may be locked as aforedescribed. Full receptacles may now be placed, one after another, upon the platform or other load receiving portion of the scale, and the operator will be able to instantly determine the net weight of the receptacle contents by the dial reading and will not have to take into consideration the weight of the receptacle containing the material in that the same will be automatically compensated for by means of the tare system.

Thus, it will be understood that the present invention embraces a counterpoise particularly intended for use as a tare member, this member having a far greater capacity than has heretofore been possible in connection with devices of this character, As will be apparent, this benefit is to be attributed among other facts, to the feature of having the poise beam, when in its neutral position, lying at a point almost wholly to one side of the main beam pivot, so that no portion of the poise beam serves to counterbalance in effect other portions thereof. Thus, it is obvious by means of the invention herewith presented, a greater capacity is incorporated in the counterpoise, the range of this member being further increased incident to the fact that the scale 36 of the index 35 may present a far greater number of subdivisions than has heretofore been possible. This is to be atributed to the fact that these graduations may be so minute as to be virtually indecipherable to the naked eye, although the same are readily capable of being read incident to the use of the magnifying lense employed. Due to the fact that the counterpoise moves as a unit with the main beam of the scale, it is apparent that the latter will encounter on interference to its movement and thus no errors will occur in this connection. Furthermore, it will be evident that by means of the invention herewith presented, the setting of the parts may be ascertained with greater facility and due to the fact that the reading is accomplished by what might be termed a neutral point of sight, and by direct reading, it is obvious that any errors of the rack and pinion do not enter into the result.

It will furthermore be appreciated that the locking devices for the scale mechanism and tare member permit of the former being retained against movement when this is desired, while the latter may be locked with respect to the main beam, so that the setting of the same will not be disturbed irrespective of the severe usage to which the scale may be subjected.

Also, it will be apparent that by means of the construction herewith suggested, the operator is capable of reading the dial as well as the tare member setting, without it being necessary for him to alter his position in order to effect these two readings, this result being attributable to the disposition of the opening in the offset portion of the housing, and the arrangement of the index scale below this opening, and in line with the focusing point of the lense 38. In this connection it is to be noted that this reading is further greatly facilitated incident to the fact that the interior surface of the lense mounting 37 is preferably painted white and a suitably shaded source of illumination 51 may be positioned adjacent the upper end of the dial 11 and direct its rays towards the face of this dial, as well as though the lense 38 to expedite the reading, which is further facilitated as afore-brought out, by this latter member which increases the visibility of the graduations, which graduations, as also aforementioned, are so disposed with regards to difference in length and marking, that they may readily be distinguished.

Finally, it is to be understood that the parts of the mechanism hereinbefore described, may be so disposed and connected with each other that any inequalities occurring in manufacture or due to wear of the parts may readily be compensated for, by suitable adjustments to properly correlate the same.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. In a scale, the combination with a pivotally mounted beam, of a poise including a body and a bracket connected with said body and slidably engaging said beam, and a pin carried by said beam and engagable by said bracket for limiting the movement of the poise with respect to the beam.

2. In a scale, the combination with a pivotally mounted beam, of a poise movably connected with said beam, actuating means connected with said poise for shifting the same, a shaft forming a part of said actuating means, a sleeve carried by said beam, said shaft being supported by said sleeve and extending beyond the same, and operating means carried by the extending portion of said shaft.

3. A scale including, in combination, a pivotally mounted beam, a poise movable with respect thereto, a scale carried by said poise, a pointer carried by said beam and registering with the graduations of said scale, and a housing beyond said scale; said housing being formed with a sight opening in line with said pointer.

4. A scale including, in combination, a pivotally mounted beam, a poise movable with respect thereto, indicia carried by said poise, a housing surrounding said beam and poise, said housing being formed with an opening in line with the path of travel of said indicia, and a spherical lense closing said opening.

5. In a scale, the combination with a pivotally mounted beam, of a poise movably connected therewith, means connected with said poise for shifting the same, said means including a shaft, a sleeve carried by the beam, said shaft being supported by said sleeve and extending beyond the same, operating means carried by the extending portion of said shaft, and means cooperating with said operating means for locking said shaft.

6. A scale including, in combination, a pivotally mounted beam, a poise beam movable with respect thereto, a housing enclosing said beam, poise actuating means exterior of said housing and connected with said poise, said actuating means being normally immovable relative to said beam, and means for locking said poise actuating means.

7. A scale including, in combination, a pivotally mounted beam, a poise beam movable with respect thereto, a housing enclosing said beam, poise actuating means exterior of said housing and connected with said poise, said actuating means being movable with said beam, and means for locking said poise actuating means, said locking means preventing a movement of said parts relative to said beam.

8. A scale including, in combination, a pivotally mounted beam, a poise beam movably connected with said beam, actuating means connected with said poise for shifting the same, a shaft forming a part of said actuating means, and a sleeve carried by said beam and encircling said shaft for supporting the latter.

9. A scale including, in combination, a pivotally mounted beam, a poise movably connected with said beam, actuating means connected with said poise for shifting the same, a shaft forming a part of said actuating means, a sleeve carried by said beam, said shaft being supported by said sleeve and extending beyond the same, operating means carried by the extending portion of said shaft, and a lock nut carried by said shaft and engagable with said actuating means for forcing the latter into locking contact with said sleeve.

10. A scale including, in combination, a pivotally mounted beam, a poise carried by said beam, actuating means for said poise, said actuating means including a shaft, supporting means for said shaft, operating means carried by said shaft, and locking means also carried by said shaft and adapted to force said operating means into contact with said supporting means for locking said actuating means.

11. A scale including, in combination, a pivotally mounted beam, a poise beam, actuating means for moving said poise beam with respect to said pivotally mounted beam, means for locking said actuating means, and indicia associated with said poise beam.

12. A scale including, in combination, a pivotally mounted beam, a poise beam, actuating means for moving said poise beam with respect to said first named beam, means for locking said actuating means, and means for locking said first named beam against movement.

13. A scale including, in combination, a pivotally mounted beam, a poise movably connected with said beam, a poise shifting means including a shaft in axial alignment with said beam pivot and means for locking said shaft against movement.

14. A scale including, in combination, a pivotally mounted beam, a poise movable with respect thereto, an angular face plate forming a part of said poise and a scale carried by said face plate, said scale being minutely subdivided.

15. A scale including, in combination, a pivotally mounted beam, a poise movable with respect thereto, a graduated scale carried by said poise, and a pointer carried by said beam, and registering with the graduations of said scale.

16. A scale including, in combination, a pivotally mounted beam, a poise movable with respect thereto, a scale carried by said poise, a mounting member above said scale, and a magnifying means carried by said mounting member.

17. A scale including, in combination, a pivotally mounted beam, a poise movably connected thereto, poise actuating means, indicia associated with said poise, means for locking said actuating means, and means for locking said beam.

In testimony whereof we affix our signatures.

LOUIS A. OSGOOD.
ELMER E. WOLF.